(12) United States Patent
Arimilli et al.

(10) Patent No.: US 8,266,504 B2
(45) Date of Patent: *Sep. 11, 2012

(54) DYNAMIC MONITORING OF ABILITY TO REASSEMBLE STREAMING DATA ACROSS MULTIPLE CHANNELS BASED ON HISTORY

(75) Inventors: Ravi K. Arimilli, Austin, TX (US); Piyush Chaudhary, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 762 days.

This patent is subject to a terminal disclaimer.

(21) Appl. No.: 12/423,677

(22) Filed: Apr. 14, 2009

(65) Prior Publication Data

US 2010/0262883 A1    Oct. 14, 2010

(51) Int. Cl.
*H03M 13/00* (2006.01)
(52) U.S. Cl. ...................................... 714/774
(58) Field of Classification Search ............... 714/11–13, 714/25–27, 30–33, 39–42, 734–737, 766–769, 714/774–776, 799, 818–820
See application file for complete search history.

(56) References Cited

U.S. PATENT DOCUMENTS

| | | | |
|---|---|---|---|
| 5,010,558 A | 4/1991 | Yost et al. | |
| 5,257,369 A | 10/1993 | Skeen et al. | |
| 5,403,639 A | 4/1995 | Belsan et al. | |
| 5,485,453 A | 1/1996 | Wahlman et al. | |
| 5,504,861 A | 4/1996 | Crockett et al. | |
| 5,557,775 A | 9/1996 | Shedletsky | |
| 5,805,804 A | 9/1998 | Laursen et al. | |
| 5,923,667 A | 7/1999 | Poiraud et al. | |
| 6,252,851 B1 | 6/2001 | Siu et al. | |
| 6,424,659 B2 | 7/2002 | Viswanadham et al. | |
| 6,829,240 B1 | 12/2004 | Lincoln et al. | |
| 7,277,958 B2 | 10/2007 | Chung et al. | |
| 7,716,312 B2 | 5/2010 | Gamble | |
| 7,945,577 B2 | 5/2011 | Altinel et al. | |
| 2002/0136218 A1 | 9/2002 | Cardoso | |

(Continued)

FOREIGN PATENT DOCUMENTS

EP    1601163 A1    11/2005

OTHER PUBLICATIONS

"RapidIO Interconnect Specification Part 10: Data Streaming Logical Specification", RapidIO Trade Association, Revision 1.3.A, Jun. 2005, pp. 1-48.

(Continued)

*Primary Examiner* — Nadeem Iqbal
(74) *Attorney, Agent, or Firm* — Stephen J. Walder, Jr.; Diana R. Gerhardt

(57) ABSTRACT

Mechanisms are provided for processing streaming data at high sustained data rates. These mechanisms receive a plurality of data elements over a plurality of non-sequential communication channels and write the plurality of data elements directly to the file system of the data processing system in an unassembled manner. The mechanisms determining whether to perform a data scrubbing operation or not based on history information indicative of whether data elements in the plurality of data elements are being received in a substantially sequential manner. The mechanisms perform a data scrubbing operation, in response to a determination to perform data scrubbing, to identify any missing data elements in the plurality of data elements written to the file system and assemble the plurality of data elements into a plurality of data streams in response to results of the data scrubbing indicating that there are no missing data elements.

7 Claims, 7 Drawing Sheets

U.S. PATENT DOCUMENTS

| | | | |
|---|---|---|---|
| 2002/0143499 | A1 | 10/2002 | Kurosawa et al. |
| 2002/0143764 | A1 | 10/2002 | Martin et al. |
| 2003/0084237 | A1 | 5/2003 | Yoshida et al. |
| 2004/0085999 | A1 | 5/2004 | Burnett et al. |
| 2004/0103218 | A1 | 5/2004 | Blumrich et al. |
| 2004/0154041 | A1 | 8/2004 | Zhang et al. |
| 2004/0260673 | A1 | 12/2004 | Hitz et al. |
| 2005/0182776 | A1 | 8/2005 | Yennie |
| 2005/0193287 | A1 | 9/2005 | Guo et al. |
| 2005/0207389 | A1 | 9/2005 | Shiao et al. |
| 2005/0286526 | A1 | 12/2005 | Sood et al. |
| 2006/0031722 | A1 | 2/2006 | Kolvick, Jr. et al. |
| 2006/0069772 | A1 | 3/2006 | Clark |
| 2006/0080426 | A1 | 4/2006 | Brunswig et al. |
| 2006/0168637 | A1 | 7/2006 | Vysotsky et al. |
| 2006/0218199 | A1 | 9/2006 | Kishi |
| 2006/0239282 | A1 | 10/2006 | Dick et al. |
| 2007/0133619 | A1 | 6/2007 | Lee et al. |
| 2007/0217763 | A1 | 9/2007 | Siemens et al. |
| 2008/0082669 | A1 | 4/2008 | Williams et al. |
| 2008/0195840 | A1 | 8/2008 | Archer et al. |
| 2008/0235477 | A1 | 9/2008 | Rawson |
| 2009/0157766 | A1 | 6/2009 | Shen et al. |
| 2009/0161568 | A1 | 6/2009 | Kastner |
| 2009/0216770 | A1 | 8/2009 | Shrinivasan et al. |
| 2009/0300385 | A1 | 12/2009 | Archer et al. |
| 2010/0158048 | A1 | 6/2010 | Arimilli et al. |
| 2010/0262578 | A1 | 10/2010 | Arimilli et al. |
| 2010/0318748 | A1 | 12/2010 | Ko et al. |
| 2011/0029674 | A1 | 2/2011 | Sidman |

OTHER PUBLICATIONS

Ford, Bryan, "Structured Streams: a New Transport Abstraction", SIGCOMM'07, Aug. 27-31, 2007, pp. 361-372.

U.S. Appl. No. 12/342,193, filed Dec. 23, 2008, Arimilli et al.

Humphreys, Greg et al., "WireGL: A Scalable Graphics System for Clusters", ACM SIGGRAPH 2001, Aug. 12-17, 2001, pp. 129-140.

Meijer, Sjoerd et al., "Automatic partitioning and mapping of stream-based applications onto the Intel IXP Network Processor", 10th International Workshop on Software & Compilers for Embedded Systems (SCOPES), 2007, pp. 23-30.

Muller, Nathan J., "Improving and Managing Multimedia Performance Over TCP/IP Nets", International Journal of Network Management, 8, 1998, pp. 356-367.

Nelson, Jay, "A Stream Library Using Erlang Binaries", Erlang '05, ACM, Sep. 25, 2005, pp. 9-16.

International Search Report and Written Opinion dated Jun. 9, 2010 for International Application No. PCT/EP2009/063888, 9 pages.

USPTO U.S. Appl. No. 12/342,193.

USPTO U.S. Appl. No. 12/423,656.

Office Action mailed Sep. 13, 2010 for U.S. Appl. No. 12/342,193, 18 pages.

Office Action mailed Sep. 1, 2011 for U.S. Appl. No. 12/342,193, 16 pages.

Response to Office Action filed with the USPTO on Aug. 9, 2011 for U.S. Appl. No. 12/423,656, 19 pages.

U.S. Appl. No. 12/423,656, filed Apr. 14, 2009, Arimilli, Ravi K., et al.

Office Action mailed Mar. 27, 2012 for U.S. Appl. No. 12/342,193, 15 pages.

USPTO U.S. Appl. No. 13/438,227.

Appellants' Brief filed with the USPTO on Jul. 11, 2011 for U.S. Appl. No. 12/342,193, 34 pages.

Office Action mailed May 9, 2011 for U.S. Appl. No. 12/423,656, 25 pages.

Response to Final Office Action filed with the USPTO on Jul. 11, 2011 for U.S. Appl. No. 12/342,193, 9 pages.

Appeal Brief filed with the USPTO on Jan. 18, 2012 for U.S. Appl. No. 12/342,193, 38 pages.

Interview Summary mailed Nov. 21, 2011 for U.S. Appl. No. 12/423,656, 11 pages.

Notice of Allowance mailed Jan. 6, 2012 for U.S. Appl. No, 12/423,656, 18 pages.

Final Office Action mailed Mar. 10, 2011 for U.S. Appl. No. 12/342,193, 15 pages.

Interview Summary dated Feb. 28, 2011 for U.S. Appl. No. 12/342,193, 3 pages.

Response to Office Action filed with the USPTO on Dec. 13, 2010 for U.S. Appl. No. 12/342,193, 20 pages.

DYNAMIC MONITORING OF ABILITY TO REASSEMBLE STREAMING DATA ACROSS MULTIPLE CHANNELS BASED ON HISTORY

GOVERNMENT RIGHTS

This invention was made with United States Government support under Agreement No. HR0011-07-9-0002, awarded by DARPA. THE GOVERNMENT HAS CERTAIN RIGHTS IN THE INVENTION.

BACKGROUND

The present application relates generally to an improved data processing apparatus and method and more specifically to mechanisms for reassembling streaming data across multiple packetized communication channels from multiple sources.

Ongoing advances in distributed multi-processor computer systems have continued to drive improvements in the various technologies used to interconnect processors, as well as their peripheral components. As the speed of processors has increased, the underlying interconnect, intervening logic, and the overhead associated with transferring data to and from the processors have all become increasingly significant factors impacting performance. Performance improvements have been achieved through the use of faster networking technologies (e.g., Gigabit Ethernet), network switch fabrics (e.g., Infiniband, and RapidIO®), TCP offload engines, and zero-copy data transfer techniques (e.g., remote direct memory access). Efforts have also been increasingly focused on improving the speed of host-to-host communications within multi-host systems. Such improvements have been achieved in part through the use of high-speed network and network switch fabric technologies.

As the demand for processing of larger amounts of data increases, the mechanisms are needed to increase data processing system performance correspondingly. For example, modern applications are requiring higher sustained data rates, i.e. data rate of constant data flow, but the data processing systems are unable to handle such sustained data rates adequately with the same performance as when similar systems run applications requiring lower data rates. The limitations of the processing abilities of known data processing systems often are due to the difference in bandwidth that may be handled by the input/output interfaces and processors when compared with the bandwidth of memory subsystems. These limitations result in an inability of known data processing systems to handle the increased demands for processing higher sustained data rates.

As one example, modern facial recognition software that captures facial features of individuals in a real-time environment, such as in an airport, office building, or the like, often requires a large amount of sustained data being fed to a computing system for analysis and storage. Such analysis needs to be performed quickly for purposes of identifying individuals of interest and increasing the overall security of the premises being monitored. Because of the limits on processing power of current computing systems, the amount of sustained data that may be captured and analyzed is limited and thus, accurate identification of individuals of interest within a relatively short period of time is made less likely.

SUMMARY

In one illustrative embodiment, a method, in a data processing system, is provided for processing streaming data at high sustained data rates. The method comprises receiving a plurality of data elements, in the data processing system, over a plurality of non-sequential communication channels and writing the plurality of data elements directly to a file system of the data processing system in an unassembled manner. The method further comprises determining whether to perform a data scrubbing operation or not based on history information indicative of whether data elements in the plurality of data elements are being received in a substantially sequential manner. Moreover, the method comprises performing a data scrubbing operation, in response to a determination to perform data scrubbing, to determine if there are any missing data elements that are not present in the plurality of data elements written to the file system. Furthermore, the method comprises assembling the plurality of data elements into a plurality of data streams associated with the plurality of non-sequential communication channels in response to results of the data scrubbing indicating that there are no missing data elements.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
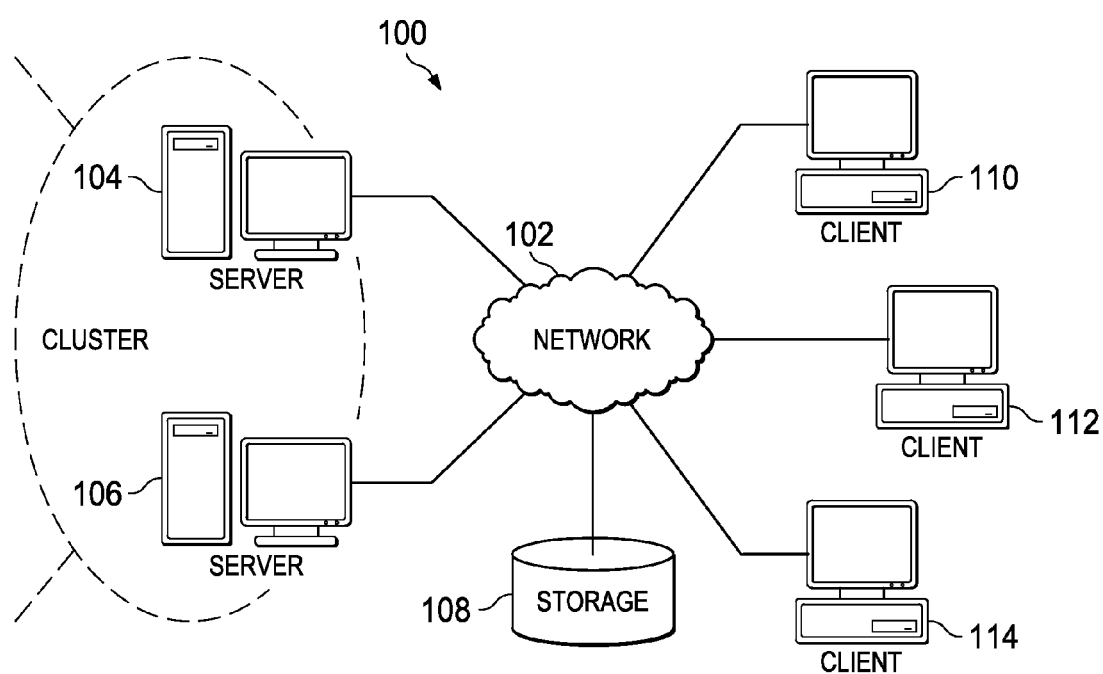
FIG. 1 is an example representation of an example distributed data processing system in which aspects of the illustrative embodiments may be implemented.

The illustrative embodiments provide mechanisms for reassembling streaming data across multiple communication channels. With the mechanisms of the illustrative embodiments, a large amount of sustained data, e.g., on the order of 30 Gbytes/s, is streamed to a storage system. The data may achieve such a large sustained data rate by distributing the transmission over a plurality of communication channels. Thus, original portions of data, either from the same source or a plurality of sources, are broken into separate packets, of potentially varying sizes, that are sent across the plurality of communication channels in a distributed manner with the bandwidth of the sum of the communication channels equaling the sustained data rate at which the data is streamed.

For example, in one illustrative embodiment, a plurality of processors may be provided with each processor executing a small portion of code, e.g., of a single application or multiple small applications, which processes portions of a data set. The processors may execute for a period of time and then stop with their state information being stored. The data in the memories associated with these processors may be dumped to the storage system over a plurality of communication channels in an out-of-order manner. For example, the plurality of processors may be processors of a distributed computing cluster operating on Message Passing Interface (MPI) jobs, as described hereafter, with the stoppage and storing of state information being performed in response to the processor experiencing a MPI_BARRIER( ) operation call. Once all of the processors have been stopped and their state stored, the data stored in the memories may be dumped to the storage system by transmitting the various portions of the data from each processor to the storage system in a plurality of data streams in an out-of-order manner over a plurality of different communication channels which, in one illustrative embodiment, may be packetized communication channels.

The storage system comprises one or more storage devices, a controller, file system, data scrubber, and the like. Data flows into the storage system from all of the communication channels and is written directly to the file system in an unassembled manner or format. The metadata associated with the portions of data streamed to the storage system may be compiled into a metadata directory of the portions of data. The data scrubber performs a scrubbing operation on the unassembled data in the file system to determine if there are any missing portions of data, e.g., missing data packets or the like. For example, the data scrubber may scrub the metadata directory to determine if the metadata indicates that metadata for portions of data are missing in the metadata directory. The data scrubber may further reassemble the data streams from the unassembled data stored within the file system once it is determined that all of the data for the various data streams have been received by the storage system. Only when all of the portions of the data from the memories of the processors has been received and reassembled, is the data in the file system of the storage system released to the file system for access by other processes.

As mentioned above, the data scrubber may analyze the metadata associated with portions of the unassembled data in the file system, as stored in the metadata directory, to determine if there is missing portions of data or not. If the data scrubber identifies missing portions of data, e.g., missing data packets, a request is transmitted back to the appropriate processor requesting a retransmission of the missing portions of data. If that request times out, the data scrubber may request retransmission of the missing data packets again up to a predetermined number of tries or a predetermined amount of time. If the missing data packets are not received within the predetermined number of tries or the predetermined amount of time, the associated processor may be considered to be offline or otherwise not useable and the data scrubber may inform an intelligent dispatcher/scheduler of the status of the processor as being offline or unavailable. The intelligent dispatcher/scheduler may then adjust workloads for the remaining processors in the plurality of processors based on the unavailability of certain processors within the plurality of processors.

The data scrubber takes some time to operate on the metadata to determine if there are missing data packets. Thus, it is beneficial to use this data scrubber only when necessary. In another illustrative embodiment, history information is utilized to determine whether to turn off the operation of the data scrubber with regard to checking for missing portions of data. This history information may be maintained by the storage system controller and may be used to update routing history information within switches of a data network through which the data streams are sent from the processors to the storage system. Essentially, the history information may identify which paths, from each source, e.g., processor, through the data network result in sequential data transmissions and which paths do not. This information may be communicated back to the switches which may store this information in history tables for use in selecting which paths to transmit data from a particular source to the storage system.

The history information maintained by the storage system controller may include identifiers of the most recently received data packets from the particular sources, e.g., processors, within a predetermined period of time. This history information may be used by the storage system controller to determine if a next data packet that is received from that particular source is within a predetermined number of packets, or packet range, from the most recently received data packet. If the next received data packet is not within the predetermined number of packets, then a flag may be set indicating that the data packets for the data stream from that source are most likely not going to be received by the storage system in a sequential manner. This may occur, for example, when data packets of a data stream take different paths through the data network, and thus, may experience differing amounts of delay. In such a case, data scrubbing is appropriate since it is very possible that data packets may not have been received at the storage system and may have been dropped. While the data packets are received within the predetermined packet range, the data may be considered to be transmitted sequentially and the flag may not be set, thereby indicating that data scrubbing is not necessary. In this way, data scrubbing may be targeted to only those sources that are most likely to have had dropped packets during transmission to the storage system. Thus, if some processors are closer, from a network topology stand point, to the storage system than others, the data streams from the further away processors will be subjected to data scrubbing more often than data streams from closer processors which are less likely to have dropped packets.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

One data processing system in which the mechanisms of the illustrative embodiments may be implemented is in a parallel computing system. A parallel computing system is a computing system with more than one processor for parallel processing of tasks. A parallel program is a program that may consist of one or more jobs that may be separated into tasks that may be executed in parallel by a plurality of processors. Parallel programs allow the tasks to be simultaneously executed on multiple processors, with some coordination between the processors, in order to obtain results faster.

There are many different approaches to providing parallel computing systems. Examples of some types of parallel computing systems include multiprocessing systems, computer cluster systems, parallel supercomputer systems, distributed computing systems, grid computing systems, and the like. These parallel computing systems are typically distinguished from one another by the type of interconnection between the processors and memory. One of the most accepted taxonomies of parallel computing systems classifies parallel computing systems according to whether all of the processors execute the same instructions, i.e. single instruction/multiple data (SIMD), or each processor executes different instructions, i.e. multiple instruction/multiple data (MIMD).

Another way by which parallel computing systems are classified is based on their memory architectures. Shared memory parallel computing systems have multiple processors accessing all available memory as a global address space. These shared memory parallel computing systems may be further classified into uniform memory access (UMA) systems, in which access times to all parts of memory are equal, or non-uniform memory access (NUMA) systems, in which access times to all parts of memory are not equal. Yet another classification, distributed memory parallel computing systems, also provides a parallel computing system in which multiple processors are utilized, but each of the processors can only access its own local memory, i.e. no global memory address space exists across them. Still another type of parallel computing system, and the most prevalent in use today, is a combination of the above systems in which nodes of the system have some amount of shared memory for a small number of processors, but many of these nodes are connected together in a distributed memory parallel system.

The Message Passing Interface (MPI) is a language-independent computer communications descriptive application programming interface (API) for message passing on shared memory or distributed memory parallel computing systems. With MPI, typically a parallel application is provided as one or more jobs which are then separated into tasks which can be processed in a parallel manner on a plurality of processors. MPI provides a communication API for the processors to communicate with one another regarding the processing of these tasks.

There are currently two versions of the MPI standard that are in use. Version 1.2 of the MPI standard emphasizes message passing and has a static runtime environment. Version 2.1 of the MPI standard includes new features such as scalable file I/O, dynamic process management, and collective communication of groups of processes. These MPI standards are available from www.mpi-forum.org/docs/docs.html. It is assumed for purposes of this description, that the reader has an understanding of the MPI standards.

Of particular note, the MPI standard provides for collective communication of processes or tasks, i.e. communications that involve a group of processes or tasks. A collective operation is executed using MPI by having all the tasks or processes in the group call a collective communication routine with matching arguments. Such collective communication routine calls may (but are not required to) return as soon as their participation in the collective communication is complete. The completion of a call indicates that the caller is now free to access locations in a communication buffer but does not indicate that other processes or tasks in the group have completed or even have started the operation. Thus, a collective communication call may, or may not, have the effect of synchronizing all calling processes.

One way in which MPI enforces synchronization of the processes or tasks is to provide a synchronization operation referred to as the MPI_BARRIER( ) call. The MPI_BARRIER( ) call blocks the caller until all tasks or processes in the group have called MPI_BARRIER( ). Thus, the MPI_BARRIER( ) call is used with a group of tasks which must wait for the other tasks in the group to complete before proceeding to the next tasks, i.e. each task must call MPI_BARRIER( ) before any of the processors are able to execute additional tasks. Essentially, the barrier operation enforces synchronization of the tasks of a job and enforces temporal dependence.

When all of the processors encounter the MPI_BARRIER( ) call to a MPI_BARRIER operation, i.e. when all of the processors make that call and the call is received by a parallel program dispatcher or other coordination engine, a transfer of data from the local memories associated with these processors to a centralized data store is performed. This transfer of data may be performed over a plurality of different communication connections or channels. For example, the data may be sent from each processor over a different packetized communication connection to the centralized data store. The packets of data may be routed through one or more data networks along various paths such that they may be received at the centralized data store in an out-of-order manner. This data needs to be reassembled from the various packetized communication connections into a coherent set of data at the centralized data store in an efficient manner that permits high speed data transfer with large bandwidth.

The mechanisms of the illustrative embodiments provide for high speed data transfer over a plurality of different communication connections with reassembly of the data at the target data storage system. With the mechanisms of the illustrative embodiments, the processors may transmit their portions of result data over separate communication connections to the centralized data storage system which immediately writes the data to the file system. A scrubber mechanism ensures that all of the data is received by processing metadata associated with the data. The scrubber mechanism may further reassemble the various data streams from the various processors from the data stored in the file system. A history data structure may be used to determine when such scrubbing is necessary and when it can be avoided, such as in cases where the data is received in a substantially sequential manner from a particular processor.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 may be the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

It should be appreciated that the servers 104 and 106, and additional servers if any (not depicted), may be provided as part of a server cluster over which a parallel program having one or more jobs, which in turn have one or more tasks, may be distributed for processing. Alternatively, a parallel program in accordance with the mechanisms of the illustrative embodiments may be provided to a single server, e.g., server 104, which may be a supercomputer or the like, having multiple processors upon which the parallel program may be distributed. The parallel program may be of the type, as is generally known in the art, where similar tasks are performed on each of a plurality of processors but on different sets of data. That is, a superset of data may be partitioned into portions to be provided to a plurality of tasks which each perform similar processing of the data portions assigned to them. The results of such processing may be passed to other processors in the cluster or group for use in further processing portions of data from the superset of data or may be passed back to a centralized data storage system for further processing or use. Moreover, in addition to communicating results data from one processor to another or to a centralized data storage system, various communications are supported for communicating state, for synchronization, and the like, via the use of a Message Passing Interface (MPI).

Figure 2:
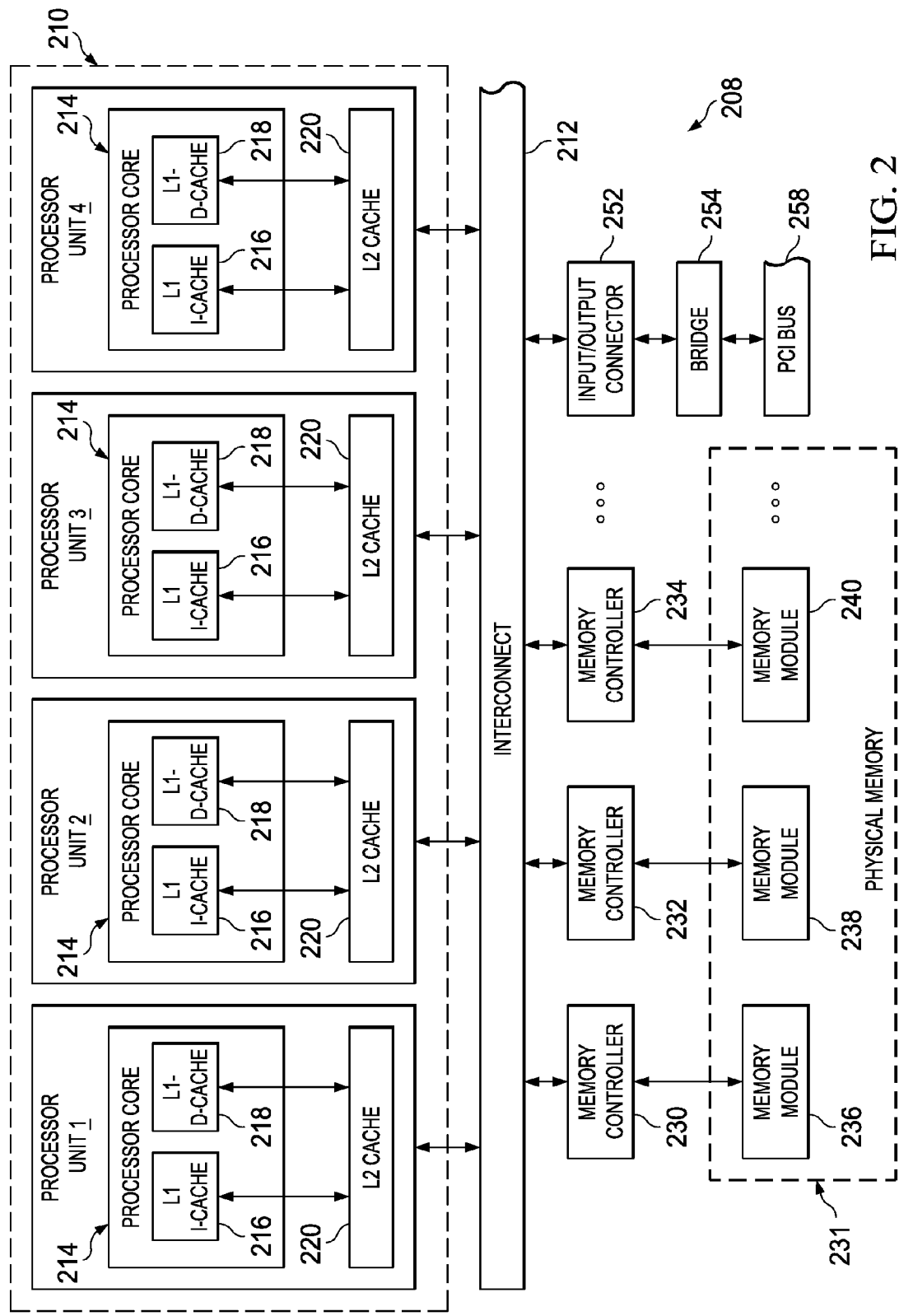
FIG. 2 is a block diagram of an example data processing system in which aspects of the illustrative embodiments may be implemented.

With reference now to FIG. 2, there is illustrated a high-level block diagram of a multiprocessor (MP) data processing system in accordance with one embodiment of the present invention. The MP data processing system may be a single computing device, such as server 104 or 106 in FIG. 1. Alternatively, the processors shown in FIG. 2 may actually be distributed in a plurality of computing devices, such as in a cluster architecture, but which have a communication mechanism, such as wired or wireless links, through which the processors may communicate with each other and with management hardware.

As depicted, data processing system 208 includes a number of processing units 1-4, referred to collectively by the processing unit group 210, coupled for communication by a system interconnect 212. Only one processing unit group 210 is shown in FIG. 2 for simplicity but it should be appreciated that more than one processing unit group may be included in the data processing system 208. In one illustrative embodiment, for example, the processing units 1-4 and/or processing unit group 210 may be implemented as a POWER™ processing chip or chips available from International Business Machines Corporation of Armonk, N.Y.

As depicted in the embodiment of FIG. 2, processing unit 210 contains four processor units 1-4, however, the illustrative embodiments are not limited by any number of processor units and the invention will support any number or type of processor units. For example, the illustrative embodiments may utilize a data processing system having any number of processor units, e.g., 2, 4, 8, 16, 32, etc., in the multi-processor system. Each processing unit group 210 may be provided as one or more integrated circuits including the one or more processor units 1-4 which comprise associated processor cores 214. In addition to registers, instruction flow logic and execution units utilized to execute program instructions, each of processor cores 214 includes associated level one (L1) instruction and data caches 216 and 218, which temporarily buffer instructions and operand data, respectively, that are likely to be accessed by the associated processor core 214.

As further illustrated in FIG. 2, the memory hierarchy of data processing system 208 also includes the physical memory 231, comprising one or more memory modules (shown as memory modules 236, 238 and 240), which form the lowest level of volatile data storage in the memory hierarchy, and one or more lower levels of cache memory, such as on-chip level two (L2) caches 220, which are utilized to stage instructions and operand data from physical memory 231 to processor cores 214. As understood by those skilled in the art, each succeeding lower level of the memory hierarchy is typically capable of storing a larger amount of data than higher levels, but at higher access latency.

As shown, physical memory 231, which is interfaced to interconnect 212 by memory controllers 230, 232 and 234, may store operand data and portions of one or more operating systems and one or more application programs. Memory controllers 230, 232 and 234 are coupled to and control corresponding memory modules 236, 238 and 240, respectively.

Also shown is input/output connector 252, which operates in a similar manner as the processing units 1-4 of the processing unit group 210 when performing direct memory access operations to the memory system. As will be appreciated, the system may have additional input/output connectors, equal to input/output connector 252, connected to interconnect 212. As various input/output devices, such as disk drives and video monitors, are added and removed on PCI bus 258 (or other similar attached buses), input/output connector 252 operates to transfer data between PCI bus 258 and interconnect 212 through bridge 254.

Those skilled in the art will appreciate that data processing system 208 can include many additional un-illustrated components, such as I/O adapters, interconnect bridges, non-volatile storage, ports for connection to networks or attached devices, etc. Because such additional components are not necessary for an understanding of the present invention, they are not illustrated in FIG. 2 or discussed further herein. It should also be understood, however, that the enhancements provided by the present invention are applicable to data processing systems of any architecture and are in no way limited to the generalized MP architecture illustrated in FIG. 2.

In accordance with the illustrative embodiments, a plurality of processors are utilized to perform parallel processing of tasks of a job of a parallel program. With such parallel processing, a superset of data is partitioned into portions of data that may individually be provided to each of the tasks of the job. The tasks may operate on the data to generate results data that may be communicated to neighboring processors in the plurality of processors if the tasks of the neighboring processors require the results for their own processing in a subsequent cycle. The processors may be provided in the same computing device, in a plurality of computing devices that are distributed and in communication with each other via one or more data networks, in a plurality of computing devices of a cluster, or the like. The processors may be part of a multiprocessor (MP) system, such as a symmetric multiprocessor (SMP) system, or the like. Any multiple processor architecture may be used to provide the plurality of processors for executing, in parallel, tasks of jobs corresponding to a parallel program, without departing from the spirit and scope of the present invention.

As mentioned above, in the illustrative embodiments, the plurality of processors support the use of a Message Passing Interface (MPI) through the calling of MPI functions provided in one or more MPI Application Program Interfaces (APIs). These processors may be part of a much larger group of processors, e.g., 10s to 100s of thousands of processors, which operate on a large set of data to execute a parallel program in a parallel and distributed manner, e.g., facial recognition, DNA analysis, or the like. In performing the execution of a parallel program in a parallel and distributed manner, the processors execute a relatively small portion of the parallel program on either the same portion of the large data set, or different portions of the large data set, and generate results data. This results data is then communicated back to a central data repository, e.g., a centralized data storage system, where it can be maintained for further use, for further processing by the large group of processors, presentation to a user, or the like.

The results data may be transmitted to the centralized data storage system over a plurality of different communication connections from the various processors of the large group of processors executing the parallel program. The results data may be transmitted in an out-of-order manner and may be written directly to the file system prior to being processed for validity or completeness. While the result data may be written to the file system directly, the data is not released for use by processes accessing the file system until it is verified and is determined to be complete. The mechanism that performs such verification and determinations of completeness is the data scrubber which looks at metadata received with the results data and determines validity and completeness based on the processing of the metadata.

The data scrubber may further reassemble the data streams of the various processors from the collection of data in the file system. That is, since data is written directly to the file system as it flows in over the plurality of communication connections, data from the various data streams along the various data communication connections may be intermingled within the file system. In analyzing the metadata associated with the received data stored in the file system, the data scrubber may reassemble the various data streams from the various sources, e.g., processors, such that coherent data streams are stored together in the file system for later use.

Because the data is transmitted over a plurality of communication connections and is written directly to the file system without requiring validity and completeness checks, or reassembly, before being sent to the file system, a very high sustainable data rate or bandwidth, e.g., approximately 30 Gbytes/s, is achieved through implementation of the illustrative embodiments. Furthermore, while the data scrubber operates on the results data received from the large group of processors, another portion of the large data set may be sent to the large group of processor for processing. Thus, while the large group of processors is operating on the next portion of data, the previously received results data may be undergoing validity and completeness checks as well as reassembly by the data scrubber. This may require that the processors maintain the transmitted data in associated temporary storage for a predetermined period of time in case the central data storage system transmits a request for retransmission of the data due to one or more portions of the transmitted data not having been received by the central data storage system for one reason or another, e.g., dropped data packets.

Figure 3:
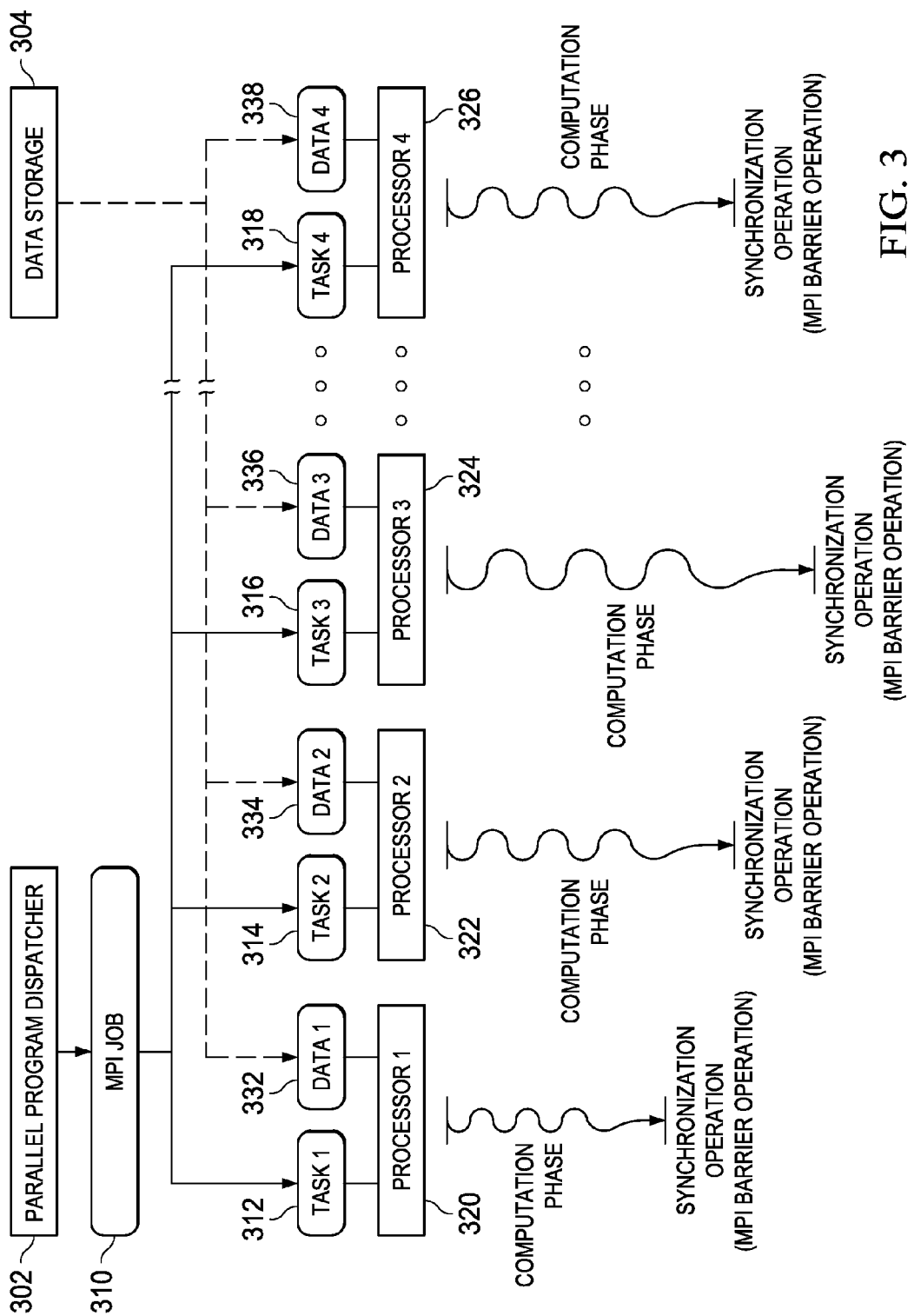
FIG. 3 is an example diagram illustrating a simple example operation of a Message Passing Interface (MPI) parallel execution system.

FIG. 3 is an exemplary diagram illustrating a simple example of the execution of a parallel program using a Message Passing Interface (MPI) parallel execution system. As shown in FIG. 3, a parallel program may be comprised of one or more MPI jobs 310 (only one of which is shown for clarity), which may be dispatched to a plurality of processors 320-326 of a parallel execution system. As discussed above, the parallel execution system may take many different forms including clusters of data processing devices, multiprocessor devices, and/or the like. For purposes of this description, it will be assumed that each of the processors 320-326 are provided in separate data processing devices that are in communication with one another via one or more data communication links, such as in a cluster arrangement or the like.

The MPI job 310 is essentially a group of tasks 312-318 that are to be executed in parallel on the plurality of processors 320-326. As is generally known in the art, parallel programs are typically programmed for separation into jobs which in turn are designed for separation into tasks to be performed in parallel. Similarly, the data upon which the parallel program is to execute may be partitioned into sets to be processed in parallel by the tasks 312-318. In some illustrative embodiments, the tasks 312-318 may be substantially the same but may be executed on different sets of data 332-338 from a superset of data stored in the data storage 304. For example, the tasks 312-318 may be clones or replicated instances of the same original task. In other illustrative embodiments, the tasks 312-318 may be different from one another and may operate on the same or a different set of data 332-338.

As shown in FIG. 3, each processor 320-326 executes its corresponding task 312-318 on a portion of data 332-338. The portion of data 332-338 that a particular processor 320-326 receives is communicated to the processor 320-326 by the parallel program dispatcher 302 by sending, for example, an ending address, and possibly a starting address if necessary, within the data superset in the data storage 304 for each processor. Each processor 320-326 may then read that data, such as via a Remote Direct Memory Access (RDMA) operation, from the data storage 304 and process it according to the associated task 312-318. Preferably, the ending addresses and starting addresses of portions of data are communicated to the processors, such as via MPI communications. The starting and ending addresses may be distributed in such a manner as to provide a same size data set 332-338 to each of the processors 320-326. It should be appreciated that, in some exemplary implementations, it may not be necessary to communicate both the starting address and the ending address of a portion of data and only one of the starting address or the ending address is needed to define the size of the data set.

The period of time in which the processors 320-326 execute the instructions of their tasks 312-318 on their portion of data 332-338 is referred to herein as the computation phase. For example, parallel programs are often developed to perform the same task on different sets of data in parallel using a plurality of processors. As one example, parallel programs have been developed to analyze DNA codes such that the same computations are performed by each of a plurality of tasks of an MPI job but on different sets of DNA coding data. Thus, in the computation phase, each of the processors 320-326 may execute instructions on different sets of data 332-338. Alternatively, the data sets 332-338 may be the same set of data but with the tasks 312-318 that are performed being different.

In either case, since there is some measure of difference in the computations being performed in the computation phase between processors 320-326, there is the possibility that the computation phase may require a different amount of processor cycles, or time, to complete in each of the processors 320-326. Many different factors may affect how long the computation phase is for each of the processors 320-326. For example, one processor 320 may perform a computation in which the data used as part of the computation is consistently found in the processor's L1 data cache while another processor 324 may have to access main memory to complete its computations, resulting in a greater latency.

Typically, in MPI jobs, the tasks 312-318 must be synchronized at some point in order to ensure proper operation and execution of the MPI job 310 and the parallel program. One way in which MPI tasks are synchronized is to make a call to a synchronization operation when the computation phase of the task is completed. In the current MPI standard, this synchronization operation is referred to as the MPI barrier operation, i.e. the MPI_BARRIER( ) function call. With this synchronization mechanism, the processors 320-326 are not permitted to continue execution of tasks until all of the processors 320-326 communicate, via point-to-point communications facilitated by the MPI APIs, that their computation phases are complete by calling the synchronization operation, i.e. the barrier operation. When the MPI barrier operation is called, this call is communicated to each of the other processors 320-326 executing tasks in the MPI job 310. Once each of the processors 320-326 perform a call to the MPI barrier operation, results data, obtained as a result of the computations performed during the computation phases, may be communicated between the processors 320-326, e.g., from a processor to each of its neighboring processors 320-326 in a cluster of processors, and the processors 320-326 are permitted to continue execution of tasks based on this results data and other data sets, if any, provided to the tasks. Alternatively, or in addition, the results data may be communicated to a central data storage system for further use, further processing, presentation to a user, or the like.

When the results data is to be transmitted to the centralized data storage system, the data is preferably transmitted over a plurality of data communication connections or channels. These data communication connections may utilize any of a number of different communication protocols and data rates. The data communication connections preferably support packetized data communication such that metadata may be provided along with the data payload, such as in the header information of the data packets. In one illustrative embodiment, the data communication connections are 10 GigE communication connections that utilize TCP/IP as the communication protocol. Other data communication protocols and mechanisms may be used without departing from the spirit and scope of the illustrative embodiments.

The results data may be transmitted over this plurality of communication connections/channels and received at the data storage system in an out-of-order manner. That is, the results data is broadcast over the plurality of communication connections/channels and strict sequencing of the data is not required during the transmission. In addition, at the recipient data storage system, strict sequencing of the data is not required before the data is written to the file system, as opposed to prior art mechanisms. Thus, data may be received out-of-order via a plurality of data streams transmitted over a plurality of communication connections/channels, with the data preferably being packetized with metadata, and may be written directly to the file system without requiring reassembly of the data streams into data sequences, validity checks, or completeness checks before being written to the file system. Thus, from the standpoint of the processors in the large group of processors, their results data is simply dumped to the data communication connection/channel as fast as possible and, from the standpoint of the recipient file system, the data is written to the file system as fast as possible without reassembly of data streams, re-sequencing, validity checks, or completeness checks. Hence a maximum throughput over a plurality of communication connections is achieved thereby resulting in a maximal data rate of communication between the large group of processors and the data storage system.

Once the data is received and written to the file system, a data scrubber mechanism operates on the data to perform validity checks, completeness checks, and re-assembly of the data streams. The data scrubber may perform such operations at substantially a same time as the data is being written to the file system, however the operation of the data scrubber is not a pre-requisite for the received data to be written to the file system. That is, the data is written to the file system first, with the processing by the data scrubber being performed on data already written to the file system, although such processing by the data scrubber may be shortly after writing of the data to the file system is performed and before all data of a particular data stream is written to the file system. The data scrubber operates on the metadata associated with the data written to the file system to determine that the data is valid, reassemble the data with other related data of the same data stream to generate a sequential data stream, reassemble a plurality of sequential data streams into a single sequential data stream if necessary or appropriate, perform completeness checks on re-assembled data streams, and issue requests for retransmission of data should a completeness check fail. Moreover, the data scrubber may inform a dispatcher, load balancer, or other mechanism responsible for distributing work to the processors of the large group of processors, as to jobs that need to be re-run or processors that are faulty so that re-balancing of jobs may be performed.

In addition to the above, history information is utilized to determine whether to turn off the operation of the data scrubber with regard to checking for missing portions of data. This history information may be maintained and used to update routing history information within switches/routers of a data network through which the data streams are sent from the processors to the storage system. Essentially, the history information may identify which paths, from each source, e.g., processor, through the data network results in sequential data transmissions and which paths do not. This information may be communicated back to the switches/routers which may store this information in history tables for use in selecting which paths to transmit data from a particular source to the storage system.

The history information may include identifiers of the most recently received data packets from the particular sources, e.g., processors, within a predetermined period of time. This history information may be used by the storage system controller to determine if a next data packet that is received from that particular source is within a predetermined number of packets, or packet range, from the most recently received data packet. If the next received data packet is not within the predetermined number of packets, then a flag may be set indicating that the data packets for the data stream from that source are most likely not going to be received by the storage system in a sequential manner. This may occur, for example, when data packets of a data stream take different paths through the data network, and thus, may experience differing amounts of delay. In such a case, data scrubbing is appropriate since it is very possible that data packets may not have been received at the storage system and may have been dropped. While the data packets are received within the predetermined packet range, the data may be considered to be transmitted sequentially and the flag may not be set, thereby indicating that data scrubbing is not necessary. In this way, data scrubbing may be targeted to only those sources that are most likely to have had dropped packets during transmission to the storage system. Thus, if some processors are closer, from a network topology standpoint, i.e. a relatively smaller number of switches/routers through which the data is transmitted, to the storage system than others, the data streams from the further away processors will be subjected to data scrubbing more often than data streams from closer processors which are less likely to have dropped packets.

Figure 4A:
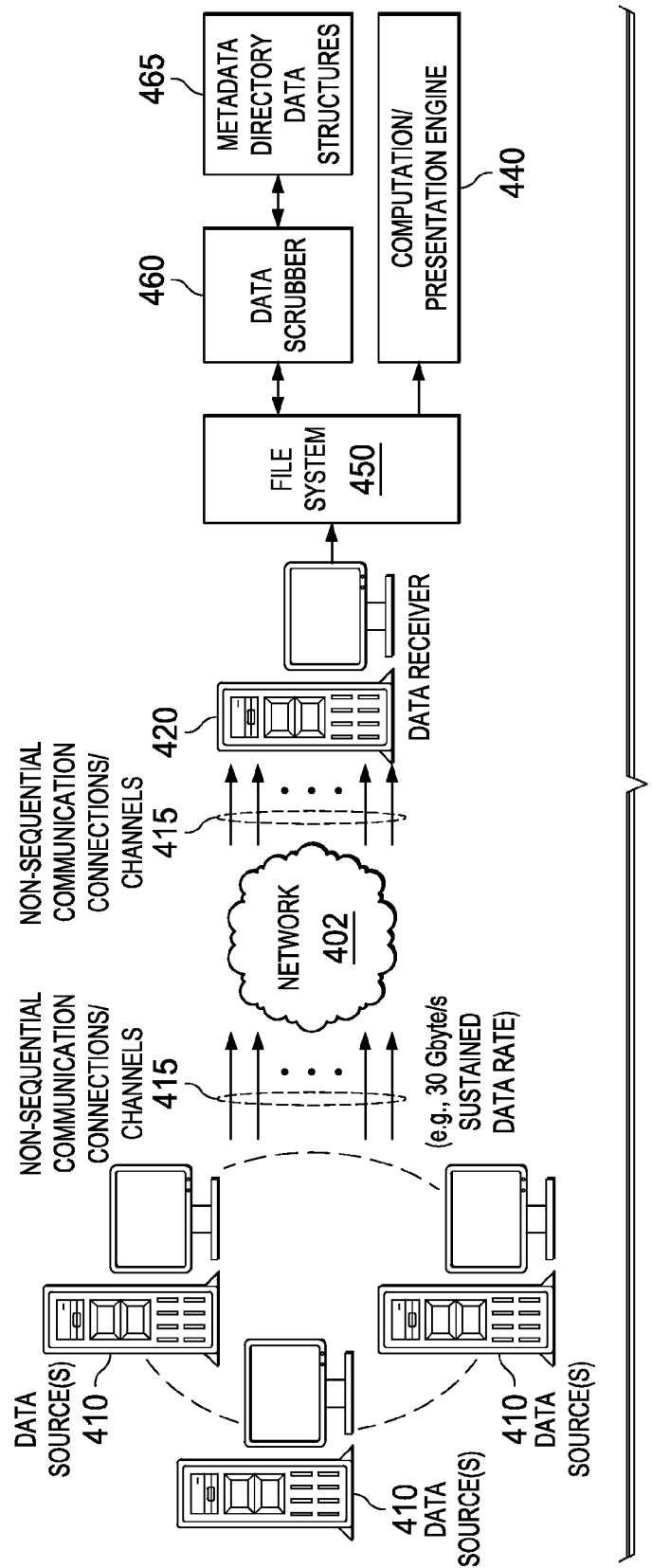
FIGS. 4A and 4B are exemplary diagrams illustrating a streaming of data at a high sustained data rate to a data processing system in accordance with one illustrative embodiment.
Figure 4B:
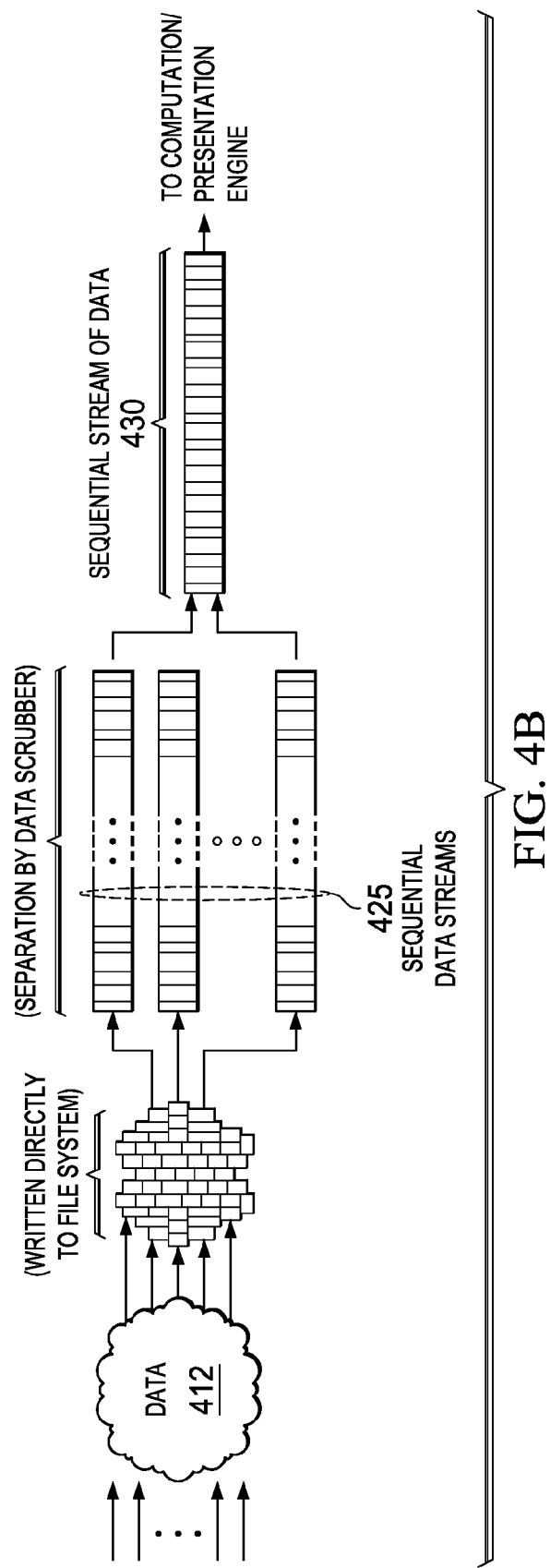

As mentioned above, because the mechanisms of the illustrative embodiments allow data to be streamed to the data storage system over a plurality of communication connections and written to the file system without requiring pre-processing of the data before writing to the file system, a large sustained data rate is achieved. FIGS. 4A and 4B are exemplary diagrams illustrating a streaming of data at a high sustained data rate to a data storage system in accordance with one illustrative embodiment. As shown in FIG. 4A, data may be streamed from one or more data sources 410 over a plurality of non-sequential communication connections or channels 415 via a network 402 to a data receiver 420. The network 402 may be comprised of a plurality of switches/routers and associated data connections through which data may be transmitted. Data sent over a communication connection 415 of the plurality of communication connections is referred to as a data stream.

Data of these various data streams may take a variety of different paths through the network 402 depending upon the paths selected by the switches/routers for transmission of the data. Thus, it is possible that data packets of the same data stream may be transmitted across different paths through the network 402 and may arrive at the data receiver 420 out-of-order, i.e. not in a sequential manner. Moreover, since multiple communication connections are being utilized to transmit the data from the data source(s) 410, which again may be processors of a cluster, MPI parallel processing system, or the like, data may be out-of-order at the data receiver 420 with regard to each data stream. Thus, data from a first data stream may be intermingled with data from a second data stream when received at the data receiver 420.

The data receiver 420, which may be a data storage system, for example, does not block the writing of data received from the network 402 before writing the data to the file system 450. That is, data received by the data receiver 420 is written directly to the file system without validity checks, completeness checks, reassembly of data streams, or the like. Thus, the storage capacity of the buffers of the data receiver 420 are not a limiting factor to the speed at which the data may be received by the data receiver 420.

Once data is written to the file system 450, the data scrubber 460 may operate on the data to perform validity checks, completeness checks, re-assemble data streams, and even re-assemble a plurality of data streams into a single sequential data stream for storage and/or use by the computation/presentation engine 440. The data scrubber 460 operates on metadata associated with the actual data received by the data receiver 420. As the metadata for received data is itself received, this metadata may be used to generate a metadata directory data structure for each individual data stream. That is, the data scrubber 460 may read the metadata, determine from the identification data stored in the metadata, what the source of the associated data is, how many data packets are in the data stream, the identity of the particular received data packet within the data stream, checksum information about the data packet, and the like. This information may be used by the data scrubber 460 to update the metadata directory data structure 465 for the particular data stream to determine which data packets have been received without error, which data packets have not been received or were received with errors, determine if the data stream has been completely received, and the like. Whether or not data packets are received with errors or not may be determined by performing validity checks, such as using a checksum or the like, as is generally known in the art. Thus, the metadata directory data structure 465 may be built up for each data stream as data of that particular data stream is received and written to the file system 460 until it is determined that all data for the data stream has been received, until a timeout condition has occurred, or the like.

Once all of the data for a data stream has been received without error, the data scrubber 460 may re-assemble the data in the data stream into a sequential set of data for the data stream and store the sequential set of data in the file system 450. For example, this may involve generating metadata indicating, in a sequential order based on identifiers associated with each data element of each data stream, e.g., data packet sequence number, the current address of that data element in the file system 460. As another example, the reassembly may involve a rewriting of the data elements in a sequential manner, based on the data element identifiers, as a contiguous portion of storage. This sequential set of data may then be provided to the computation/presentation engine 440 for further processing, presentation to a user, or the like. Alternatively, the sequential set of data may be combined with other sequential sets of data into a single sequential set of data for a single data stream that comprises all of the data streams from all of the sources, i.e. processors.

Thus, as shown in FIG. 4B, data 412 is transmitted by the data sources 410 over the data network 402 using a plurality of non-sequential communication connections/channels 415 which results in a large set of unassembled data being written directly to the file system in a non-sequential manner. The data scrubber 460 scrubs this data 412 within the file system 450 by processing the metadata associated with the data and performing various validity checks, completeness checks, and assembly of data streams. The resulting sequential data streams 425 may then be combined into a single sequential stream of data 430 representing the results of processing on all of the data sources 410. This resulting single sequential stream of data 430 may be provided to a computation/presentation engine 440 for use in further processing, storage, or presentation to a user.

It should be appreciated that while the transmission of data from the data sources to the data receiver 420 is done in such a way as to maximize the data rate, the data scrubbing performed by the data scrubber 460 may require a number of processing cycles to complete its operations. Thus, it is beneficial to minimize the use of the data scrubber 460 if possible. The mechanisms of the illustrative embodiments provide a history mechanism that may inhibit the operation of the data scrubber 460 until it is determined that data of a data stream is being received in a significantly out-of-order fashion. That is, the data scrubber 460 only operates when the history of reception of data indicates that there is the potential for missing data packets. One way in which the data receiver 420 determines whether to utilize the data scrubber 460 or not is to maintain a history of the identity of a last received data packet from a particular source and for a particular data stream. The data receiver 420 may then compare subsequently received data packets for that data stream and source to determine if the subsequent data packets are within a particular packet range of the previously received data packet or not. If they are not, then it can be determined that the data packets are being received in a substantially out-of-order manner and data scrubbing is in order. If the subsequent data packet is within the predetermined packet range, then it can be determined that the data is being received in a substantially sequential manner such that data scrubbing is not necessary. A flag may be set in response to a determination that data scrubbing is to be performed, at which point further checking to determine if data scrubbing should be performed for that particular data stream may be discontinued. Otherwise, this history check may be repeated with each subsequent data packet with the identity information regarding previously received data packets being updated dynamically based on the received data packets. Alternatively, the identities of a plurality of data packets received within a predetermined period of time of a current time may be maintained in the history data structure for a data stream and used to perform the packet range comparison with regard to each of those packets.

The history information may further be used to send update information to the switches/routers of the network 402 through which data was received so as to update the routing tables associated with these switches/routers. That is, the data receiver 420 may transmit a message back to the switches/routers through which the data was received, in response to a determination that data scrubbing is necessary, to indicate to the switches/routers that the path they selected for transmission of the data resulted in non-sequential data being received for the particular data stream. As a result, the switches/routers may update their own history information and/or routing tables to cause a selection of a different path over which to transmit data from that particular source in the future. In this way, it is more likely that data from the source will be received in a sequential manner in future data stream transmissions.

It should be noted that, while the data is written directly to the file system 450 upon receipt by the data receiver 420 with no blocking, this does not mean that the data is available for access via the file system 450 by user space applications or the like. To the contrary, while the data is present in the file system 450, the data is in a non-accessible state until the verifications and re-assembly operations of the data scrubber are complete or it is otherwise determined that the data stream has been completely received. At this point, the data receiver 420 may release the data of the data stream for use by user space applications or the like. The releasing of the data may involve setting a flag or other identifier associated with the data indicating that the data is accessible to other processes, e.g., user space applications, and is not hidden in the file system 460.

Figure 5:
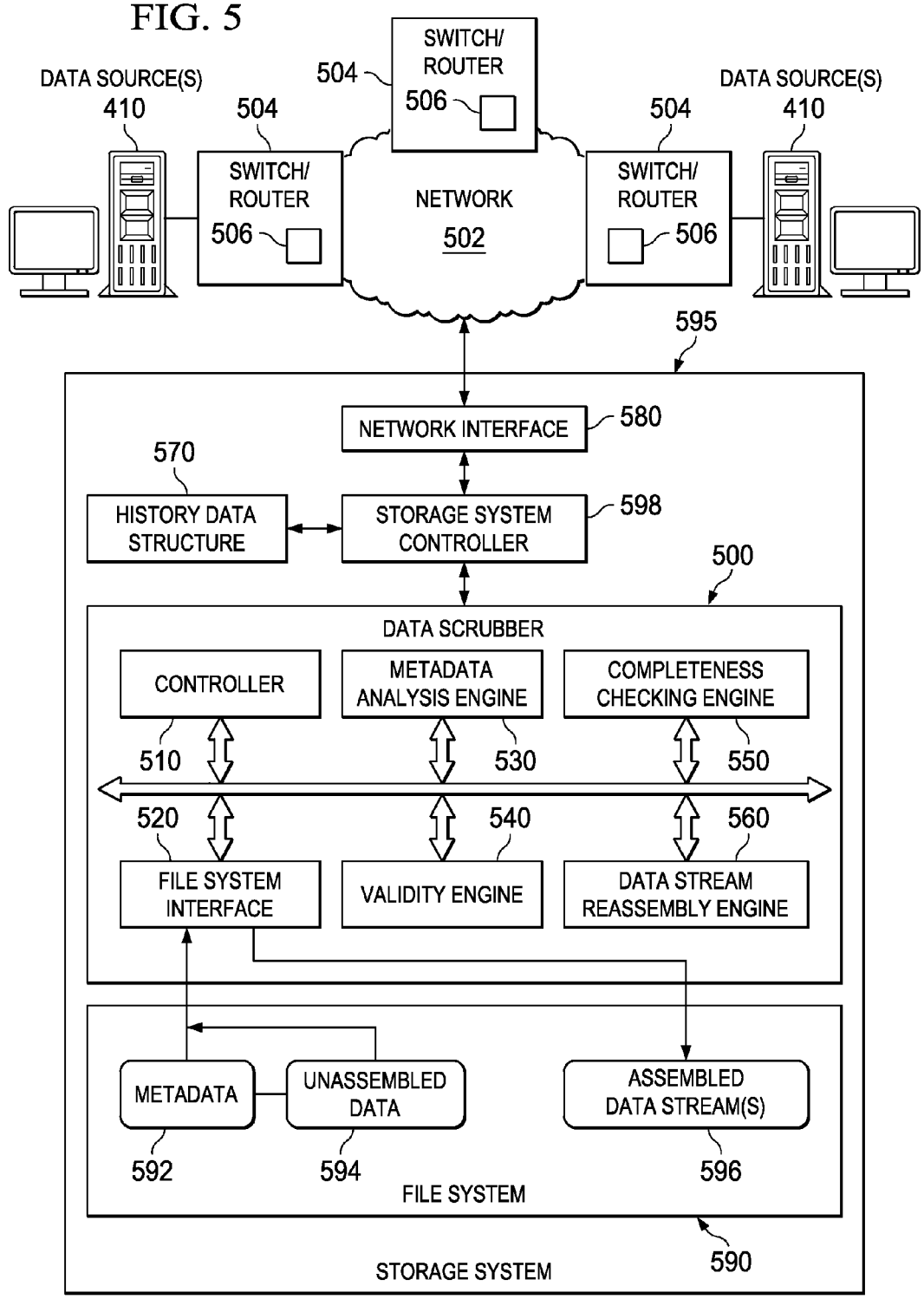
FIG. 5 is an example diagram of a data scrubber in accordance with one illustrative embodiment.

FIG. 5 is an example diagram of a data scrubber in accordance with one illustrative embodiment. The elements shown in FIG. 5 may be implemented in hardware, software, or any combination of hardware and software. In one illustrative embodiment, the elements of FIG. 5 are implemented as software instructions executed by one or more processors of one or more data processing systems.

As shown in FIG. 5, the storage system 595 includes a data scrubber 500, a file system 590, a storage system controller 598, a history data structure 570, and a network interface 580. The storage system 595 may be in communication with one or more data sources 410 via the network interface 580 one or more data networks 502 which comprise switches/routers 504. Data may be received by the network interface 580 over a plurality of data communication connections/channels and written directly to the file system 590 as unassembled data 594 and associated metadata 592. In addition, the metadata 592 may be analyzed by the storage system controller 598 and compared to information stored in the history data structure 570 to determine if the data of the data streams of the plurality of communication connections are being received sequentially or not. In response to data of a data stream being received non-sequentially, the storage system controller 598 may set a flag to initiate data scrubbing by the data scrubber 500 on data received and written to the file system 590 for that data stream. Moreover, the storage system controller 598 may send a response back along the path of the data in network 502 such that history information 506 in the switches/routers 504 through which the data stream is being routed may be updated to cause a different path to be selected for future routing from the data source.

The data scrubber 500 includes a controller 510, a file system interface 520, a metadata analysis engine 530, a validity engine 540, a completeness checking engine 550, and a data stream reassembly engine 560. The controller 510 controls the overall operation of the data scrubber 500 and orchestrates the operation of the other elements 520-560. The controller 510 retrieves metadata 592 of unassembled data 594 via the file system interface 520 and instructs the metadata analysis engine 530 to analyze the metadata to determine if the data is ready for release by the file system 590 for access by user space applications. The metadata analysis engine 530 may utilize the validity engine 540 to perform validity checks on the data to ensure that there were no errors in the received data and completeness checks to determine if all of the data of the data stream has been received or not. If necessary, the metadata analysis engine 530 may inform the controller of a need to request retransmission of data from a data source 410 in which case the controller 510 informs the storage system controller 598 which then sends the request for the retransmission of the data. In addition, a job scheduler/dispatcher of the cluster or group of data sources 410 may be informed of this need such that jobs may be adjusted to compensate for a need to re-run a task or no longer utilize a failed data source 410. The metadata analysis engine 530 may utilize the data stream reassembly engine 560 to reassemble the unassembled data 594 into sequential assembled data streams 596 which may then be released by the file system 590 for use by user level applications.

Figure 6:
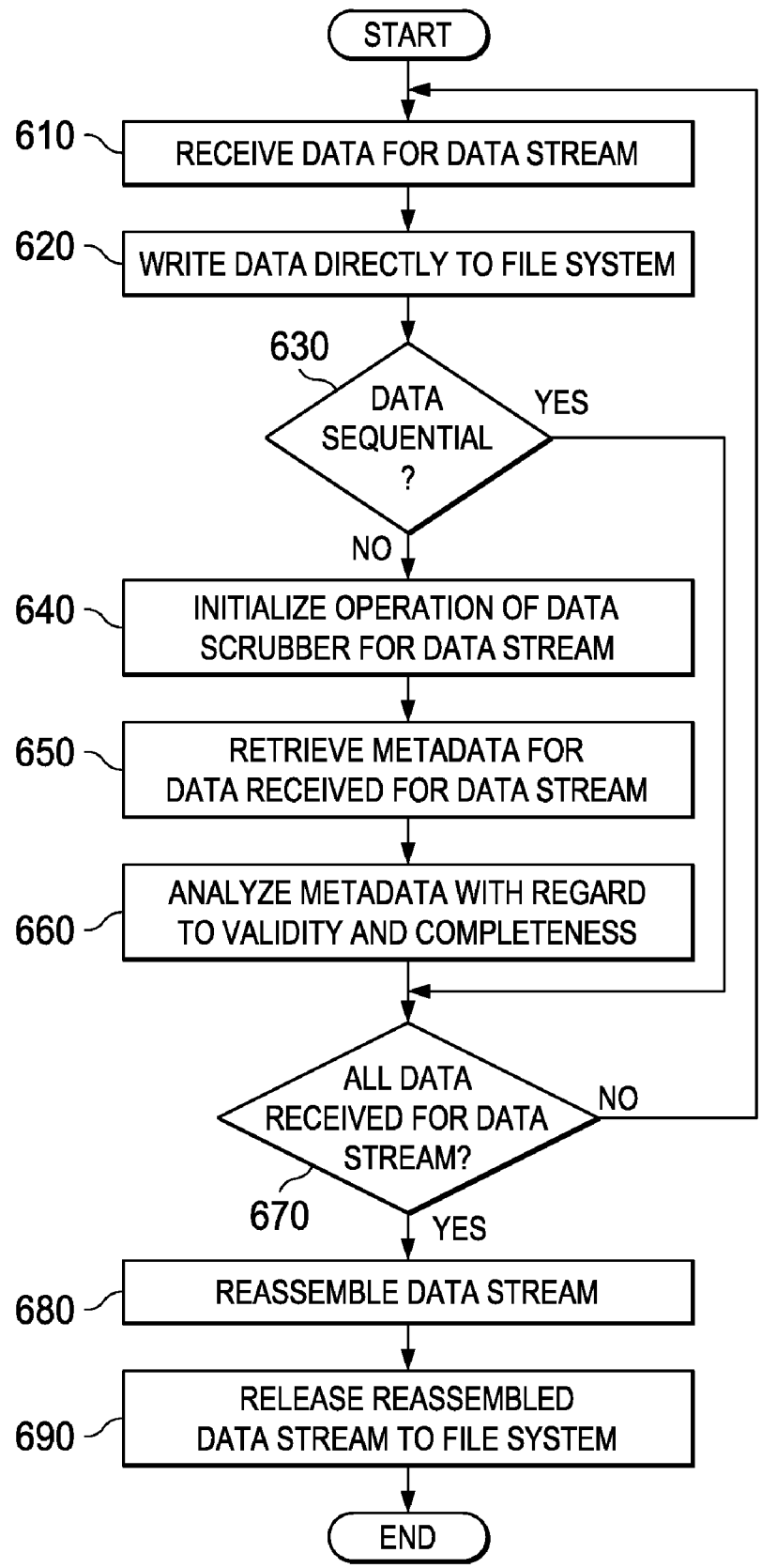
FIG. 6 is an example flowchart outlining an example operation for receiving data in a centralized data storage system in accordance with one illustrative embodiment.

FIG. 6 is an example flowchart outlining an example operation for receiving data in a centralized data storage system in accordance with one illustrative embodiment. It should be appreciated that the operation outlined in FIG. 6 may be performed for each of a plurality of data streams so as to achieve a high data rate as discussed above. The operation may be performed for this plurality of data streams in substantially a parallel manner and may be repeated with each new portion of data received.

As shown in FIG. 6, the operation starts by receiving data for a data stream from a data source via a data network (step 610). The data is written to a file system (step 620) and a determination is made as to whether the data is being received in a sequential manner with regard to previously received data for the data stream (step 630). If the data is being received in a sequential manner, the operation goes to step 670. If the data is not being received in a sequential manner, operation of a data scrubber is initialized with regard to the data stream (step 640). The data scrubber retrieves metadata associated with data received for the data stream (step 650) and analyzes the metadata with regard to validity and completeness (step 660). A determination is made as to whether all of the data for the data stream has been received without error based on these checks (step 670). If all of the data has not been received, the operation returns to step 610 and awaits the next portion of data. It should be appreciated that step 630 may be skipped in this loop since operation of the data scrubber has already been initiated with regard to this data stream.

If all of the data for the data stream has been received without error, the data stream is reassembled from the unassembled data in the file system (step 680). The reassembled data stream is then released by the file system for use by user space level applications (step 690). The operation then terminates.

Thus, the illustrative embodiments provide mechanisms for reassembling streaming data across multiple communication channels. With the mechanisms of the illustrative embodiments, a large amount of sustained data, e.g., on the order of 30 Gbytes/s, is streamed to a storage system. The data may achieve such a large sustained data rate by distributing the transmission over a plurality of communication connections/channels and by the non-blocking approach to handling the data at the recipient storage system. That is, the data is written directly to the file system in an unassembled and non-validated manner without requiring pre-processing of the data upon receipt. In this way, data is permitted to flow from the data sources directly to the file system of the storage system with processing of the data being performed after it is written to the file system and at substantially a same time as the data sources are processing a next portion of data from a large data set.

The metadata associated with the portions of data streamed to the storage system may be compiled into a metadata directory of the portions of data. A data scrubber performs a scrubbing operation on the unassembled data in the file system to determine if there are any missing portions of data, e.g., missing data packets or the like. For example, the data scrubber may scrub the metadata directory to determine if the metadata indicates that metadata for portions of data are missing in the metadata directory. The data scrubber may further reassemble the data streams from the unassembled data stored within the file system once it is determined that all of the data for the various data streams have been received by the storage system. Only when all of the portions of the data from the data sources has been received and reassembled, is the data in the file system of the storage system released for access by other processes.

If the data scrubber identifies missing portions of data, e.g., missing data packets, a request is transmitted back to the appropriate processor requesting a retransmission of the missing portions of data. If that request times out, the data scrubber may request retransmission of the missing data packets again up to a predetermined number of tries or a predetermined amount of time. If the missing data packets are not received within the predetermined number of tries or the predetermined amount of time, the associated processor may be considered to be offline or otherwise not useable and the data scrubber may inform an intelligent dispatcher/scheduler of the status of the processor as being offline or unavailable. The intelligent dispatcher/scheduler may then adjust workloads for the remaining processors in the plurality of processors based on the unavailability of certain processors within the plurality of processors.

Moreover, history information may be utilized to determine if data for a data stream is being received in substantially a sequential manner or not. This information may be used to control whether or not the data scrubbing is performed with regard to a particular data stream. In this way, the overhead of performing the data scrubbing may be avoided in situations where the data is being received in a substantially sequential manner. Furthermore, this information may be used to updated history information in switches/routers of the data network so as to affect the paths selected for routing of data to increase the likelihood that data for a data stream is received in a more sequential manner in future data stream broadcasts.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer recordable storage medium having a computer readable program recorded thereon, wherein the computer readable program, when executed on a computing device, causes the computing device to:
   receive a plurality of data elements, in the computing device, over a plurality of non-sequential communication channels;
   write the plurality of data elements directly to a file system of the computing device in an unassembled manner;
   determine whether to perform a data scrubbing operation or not based on history information indicative of whether data elements in the plurality of data elements are being received in a substantially sequential manner;
   perform a data scrubbing operation, in response to a determination to perform data scrubbing, to determine if there are any missing data elements that are not present in the plurality of data elements written to the file system; and
   assemble the plurality of data elements into a plurality of data streams associated with the plurality of non-sequential communication channels in response to results of the data scrubbing indicating that there are no missing data elements.

2. The computer program product of claim 1, wherein the data scrubbing operation is performed in response to a determination that the data elements in the plurality of data elements are not being received in a substantially sequential manner.

3. The computer program product of claim 2, wherein the computer readable program further causes the computing device to:
   inhibit performance of the data scrubbing operation in response to a determination that the data elements in the plurality of data elements are being received in a substantially sequential manner.

4. The computer program product of claim 3, wherein the computer readable program further causes the computing device to:
   set a flag to a first value indicating that data scrubbing is to be performed in response to a determination that the data elements in the plurality of data elements are not being received in a substantially sequential manner; and
   set the flag to a second value indicating that data scrubbing is not to be performed in response to a determination that the data elements in the plurality of data elements are being received in a substantially sequential manner, wherein if the flag is set, data scrubbing is performed and if the flag is not set, data scrubbing is not performed.

5. The computer program product of claim 1, wherein the history information comprises data indicating an identifier of a last received data element.

6. The computer program product of claim 2, wherein the computer readable program further causes the computing device to determine whether to perform data scrubbing or not by determining if the plurality of data elements are being received in a substantially sequential manner based on whether a current data element is within a predetermined range of data elements from a last received data element identified by the history information.

7. An apparatus, comprising:
   a processor; and
   a memory coupled to the processor, wherein the memory comprises instructions which, when executed by the processor, cause the processor to:
   receive a plurality of data elements, in the apparatus, over a plurality of non-sequential communication channels;
   write the plurality of data elements directly to a file system of the apparatus in an unassembled manner;
   determine whether to perform a data scrubbing operation or not based on history information indicative of whether data elements in the plurality of data elements are being received in a substantially sequential manner;
   perform a data scrubbing operation, in response to a determination to perform data scrubbing, to determine if there are any missing data elements that are not present in the plurality of data elements written to the file system; and
   assemble the plurality of data elements into a plurality of data streams associated with the plurality of non-sequential communication channels in response to results of the data scrubbing indicating that there are no missing data elements.

* * * * *